Sept. 5, 1967 S. H. BINGHAM 3,339,675
RAILROAD TRACK WITH BRAKING SURFACES FOR HIGH SPEED TRAINS
Filed July 28, 1966 2 Sheets-Sheet 1
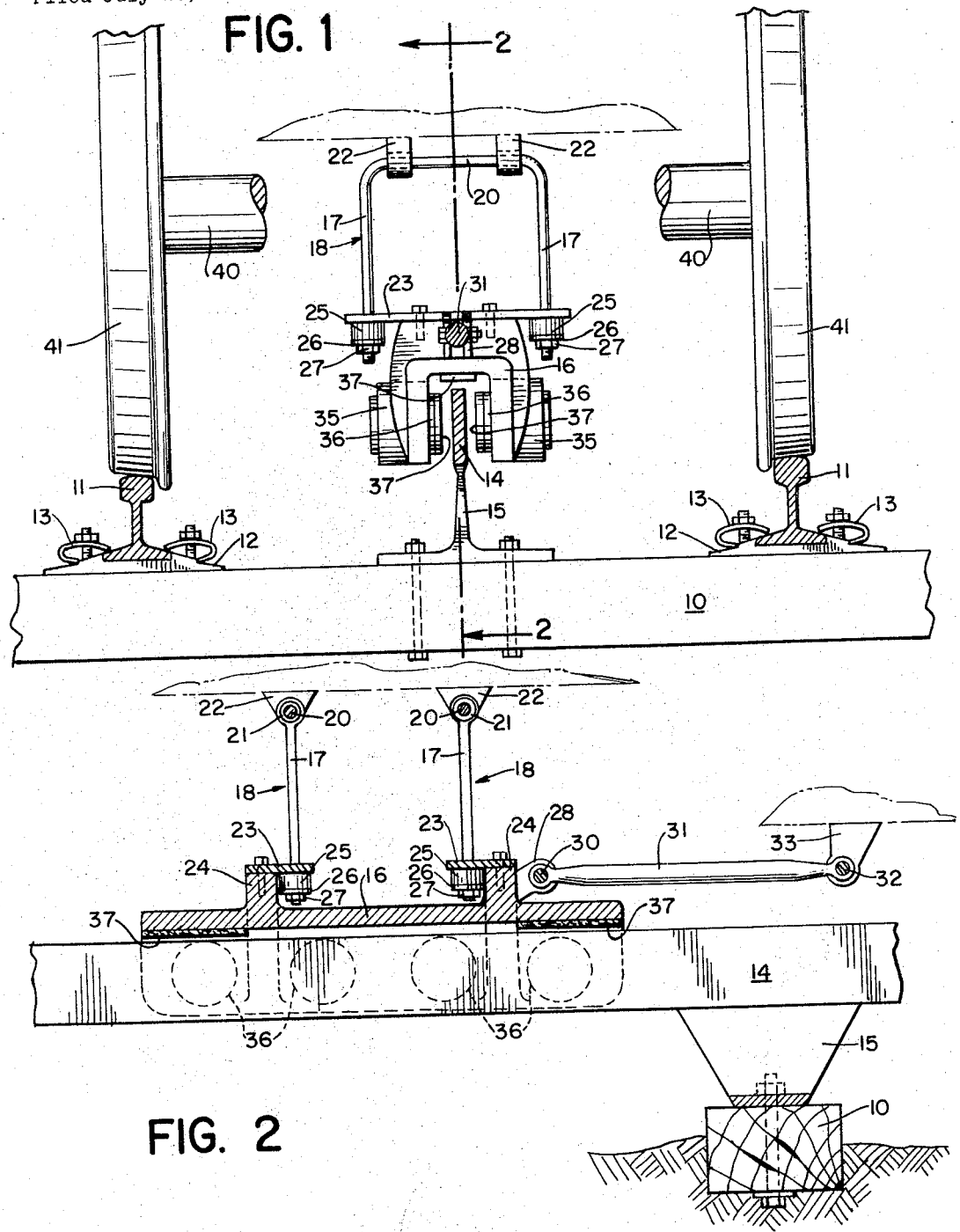
INVENTOR
SIDNEY H. BINGHAM
BY
ATTORNEYS

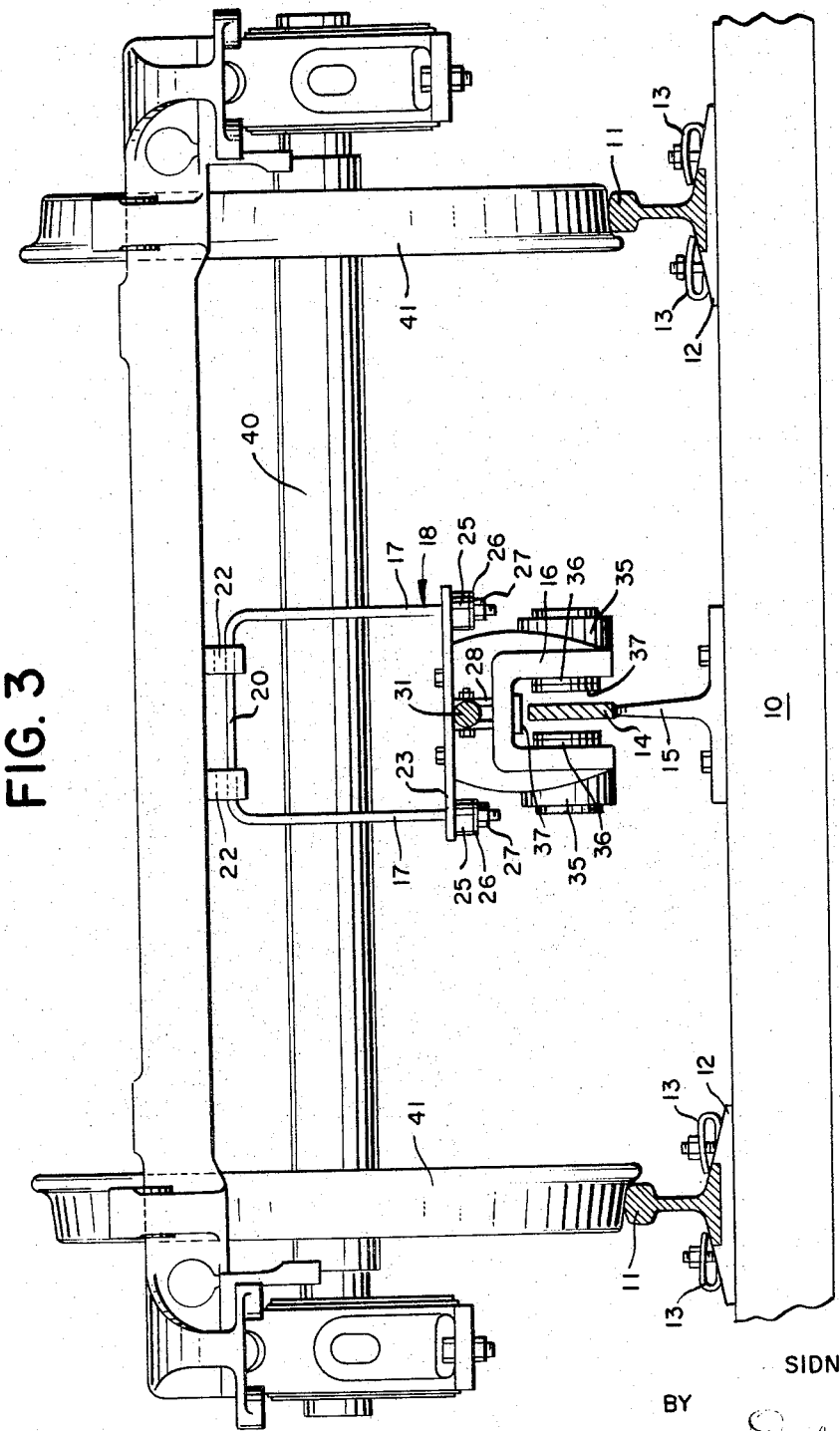

3,339,675
RAILROAD TRACK WITH BRAKING SURFACES FOR HIGH SPEED TRAINS
Sidney H. Bingham, 109 E. 35th St., New York, N.Y. 10016
Filed July 28, 1966, Ser. No. 568,501
7 Claims. (Cl. 188—43)

ABSTRACT OF THE DISCLOSURE

The present invention relates to the braking of high speed trains whether they be of the elevated monorail type or of the standard ground level type. The disclosure comprises a braking plate mounted on a high speed railway track between the rails and extending parallel to and continuous with them. A railway vehicle is provided with a channel shaped saddle member supported on either the vehicle body or the railway truck frame by downwardly facing U-shaped hangers. A link extending longitudinally of the track is pivotally connected to the saddle and the truck or car body to absorb the braking force. The hangers are mounted on the body or truck in rubber bushings. Thus the saddle is able to move to a limited extent. A plurality of piston-like brake elements are mounted on the saddle along each side of the braking plate but out of contact therewith. They are faced with brake lining material and may be caused to make braking contact with the braking plate by hydraulic, pneumatic, or electrical means. Brake lining is also placed on the inner upper face of the saddle whereby the lining can contact the top of the braking plate in unusual circumstances. In the described arrangement braking the vehicle does not affect the rolling of the vehicle wheels which could cause them to slide.

---

At the present time it is generally customary to brake vehicles such as trains by applying braking power to restrain the turning movement of the wheels. The braking effect is therefore necessarily limited by the coefficient of adherence between the wheels and track and decreases as the speed increases. In fact, the stopping distance for a given retardation coefficient increases as the square of the speed. Thus, it is apparent that trains operating at speeds of 150 miles per hour and above would travel many miles before it would be possible to bring them to a stop by methods which function to restrain turning movement of the wheels.

Devices have been utilized which sense the turning movement of the wheels during braking and thereby prevent wheel locking and consequent flat spots on the wheels. However, the result of this sensing operation is that a considerable increment is added to the distance traveled before the train is brought to a complete stop and, moreover, it is not possible to apply emergency braking rates at high speed because of the certainty of wheel locking.

By means of my present invention, all of the above difficulties are overcome and this in a very simple and efficient manner. In accordance with my invention, there is provided a vertical plate or rail extending longitudinally between the rails of a railway track which plate is engageable by brake shoes carried by the cars or other vehicles which utilize the track, these brake shoes and the longitudinally extending braking plate cooperating to retard the train or other vehicle.

As will be seen, the adherence coefficient of the wheels upon the rail is not a factor with the arrangement described above inasmuch as the braking effort is not applied to the wheels.

Additionally, the generation of heat between the braking surfaces and the brake shoes is substantially reduced due to the fact that fresh braking surfaces are being continually presented.

It is an object of the invention to provide a means of braking high speed track vehicles which does not rely upon restraint of the turning movement of the wheels and which is therefore not limited by the coefficient of adherence between the wheels and the track on which they run.

It is another object of the invention to provide a braking system which will not cause locking and sliding of the wheels upon the track when an emergency application of the brakes is made.

It is still another object to provide such a novel braking system which provides more rapid dissipation of the heat generated by the braking.

It is a further object of the invention to provide such a novel braking system which utilizes a plate extending longitudinally of the track between the running rails together with brake shoes adapted to exert braking pressure on both sides of the braking plate.

Other objects and features of the invention will be apparent when the following description is considered in connection with the annexed drawings in which:

FIGURE 1 is a transverse vertical cross-sectional view of the railroad structure showing schematically a car axle and the mode of mounting a brake structure on the associated car;

FIGURE 2 is a fragmentary longitudinal vertical cross-sectional view showing the mechanism of FIG. 1; and FIGURE 3 is a view similar to FIGURE 1 but showing a portion of a conventional car truck and indicating the positioning of the brake shoes relative to that truck.

Before proceeding with a detailed description of the mechanisms of the present invention, applicant wishes to acknowledge that he is aware of systems of track braking where the brake shoes rather than causing restraint of the turning movement of the wheels are applied to the track. All such brakes of which he is aware, however, function through the attraction of a magnetically excited shoe for the running rail. They were rough in their retarding action and required high maintenance due to mechanical limitations.

Applicant's device is, of course, distinguished from these brakes in that his is a simple mechanical action without the involvement of magnetic excitation and, additionally, does not utilize the running rail as a part of the braking system and thus cannot cause any wear or other harmful effects with respect to the running rails.

Referring now to the drawings there is depicted therein a railroad structure comprising the ties 10 and rails 11 held in position on the ties by the tie plates and clamps 12 and 13 respectively in the usual manner.

As is indicated hereinabove, the ties may be mounted in ballast or may be part of an elevated structure, as is desirable.

A braking plate 14 extends longitudinally between the rails 11 and is rigidly mounted at spaced points therealong on brackets 15 which are bolted or otherwise fastened to spaced ones of the ties 10.

Suspended from the car structure and preferably as seen in FIGURE 3 from the car truck is a saddle member 16 which straddles the braking plate or rail 14. As shown in the drawings, the saddle member 16 is fixed to depending arms 17 of two U-shaped members 18, the bases 20 of the two U-shaped members, extending through rubber bushings 21 mounted in apertures in brackets 22 fixed to the car or truck structure.

Saddle 16 is connected to the lower ends of arms 17 of U-shaped members 18 by means of transversely extending plate members 23 which are fixed to upstanding portions 24 of the saddle 16. The lower ends of the arms 17 extend through apertures in the plates 23 and carry at their lower ends rubber shock absorbers 25 which are held in position against the under surface of the plates 23 by means of washers 26 and nuts 27.

One of the upstanding members 24 of the saddle 16 is provided with a bracket 28 to which is pivotally mounted, as for example by the pin 30, a drag link 31 which at the opposite end is likewise pivotally mounted by means of a pin 32 to a bracket 33 mounted on the car structure.

The saddle 16 carries in each of its depending arms or flanges 34 a number of hydraulic cylinders 35, the piston heads 36 of which are faced with brake lining material 37 and are adapted when the cylinders are energized to engage the braking plate 14.

It will, of course, be understood that the pistons 35 are controlled in such a manner that they are simultaneously operated so that the piston heads engage the rail or plate on either side with substantially uniform pressure.

Brake lining material 37 is placed at the ends of the underface of the base of saddle 16 in order to assure that should this saddle make contact with the braking plate 14, the shock will be absorbed and there will be no arcing or sparking or, in fact, any contact between the metallic saddle and the metallic plate. Such contact does not normally occur and the use of the brake lining material 37 at these points is solely a precautionary measure.

It will be seen from the above that the arrangement and mounting of the saddle 18 provides a considerable freedom of movement of the saddle both vertically and sidewise, while at the same time assuring that the braking will be effective since the brake shoes are directly connected to the saddle and through the drag link or rod 31 to the car or truck structure which structure is, as will be readily understood, supported by axles such as that shown at 40 and wheels such as 41.

As will also be seen from the above, the structure described makes it possible to exert a large braking effort without restraining the turning movement of the car or vehicle wheels 41 and at the same time provides large areas of the plate 14 to dissipate the heat generated when the brakes are applied.

Additionally, of course, since there is no restraint to the turning movement of the wheels and no possibility that the wheels be locked so they slide upon the rails 11, there is no possibility of the wheels locking, thus completely eliminating wheel and tire wear.

Additionally, and more importantly, the braking power capable of being applied is not limited by the adherence coefficient and consequently vehicles and trains operating at speeds in the neighborhood of 150 miles and over can be brought to a stop in much less time and distance than is required by the present methods which, as stated, function to restrain the turning movement of the wheels. This is, of course, true to an even greater extent in those cases in which sensing devices to prevent locking and sliding of the wheels are present which invariably increase the distance travelled before the train can be brought to a standstill.

It will of course be obvious that the specific arrangement of the braking rail and the cylinders cooperating therewith may be varied to a great extent. For example, although hydraulically operated cylinders have been described, one could utilize as well pneumatically operated cylinders such as the usual air-brake systems or mechanically operated or electrically operated systems. Also, although cylinders on either side of the braking plate 14 have been described, it is obvious that brake shoes on opposite sides of the braking plate might be operated by a single hydraulic mechanical or electrical arrangement, such for example as the usual caliper brakes used on automobiles when brakes of the disc type are employed.

Likewise, although the braking rail has been described as centrally located between the track rails 11, this is not essential and the rail might be positioned anywhere between the tracks. Additionally, in some instances, the braking rail 11 might serve as a guide rail, especially in connection with monorail systems.

I wish, therefore, to be limited not by the foregoing description, but solely by the claims granted to me.

What I claim is:

1. In combination with a high speed vehicle for operating on rails, a longitudinally extending plate mounted between the rails, a rigid saddle member detachably mounted on the vehicle above the plate, and means carried by the saddle member and positioned adjacent and normally out of contact with said plate for movement against said plate for exerting braking pressure thereagainst.

2. The combination of claim 1, in which the last-mentioned means comprises brake shoes positioned along both sides of said plate, the braking faces of the shoes being faced with brake lining material.

3. The combination of claim 2, in which brake lining material is mounted on the under face of the upper portion of the saddle member.

4. The combination of claim 3, in which the saddle member is supported from said vehicle by means comprising depending U-shaped members mounted on the vehicle in rubber bushings, and in which the braking effort is transmitted to the vehicle by means comprising a longitudinally extending link pivotally attached to the saddle member and the vehicle, whereby to provide for limited movement of the saddle member relative to the vehicle.

5. The combination of claim 1, in which the last-mentioned means includes hydraulic means for causing said movement.

6. The combination of claim 1, in which the last-mentioned means includes pneumatic means for causing said movement.

7. The combination of claim 1, in which the last-mentioned means includes electrical means for causing said movement.

References Cited

UNITED STATES PATENTS

| | | | |
|---|---|---|---|
| 832,318 | 10/1906 | Humphrey | 188—35 |
| 994,041 | 5/1911 | Stauffer | 188—43 |
| 2,928,502 | 3/1960 | Troften | 188—43 |
| 3,096,854 | 7/1963 | Price et al. | 188—42 |
| 3,160,371 | 12/1964 | Doolittle | 188—71 X |
| 3,240,291 | 3/1966 | Bingham | 188—38 X |

DUANE A. REGER, *Primary Examiner.*

UNITED STATES PATENT OFFICE
CERTIFICATE OF CORRECTION

Patent No. 3,339,675                                          September 5, 1967

Sidney H. Bingham

It is hereby certified that error appears in the above numbered patent requiring correction and that the said Letters Patent should read as corrected below.

Column 4, line 23, after "rigid" insert -- inverted U-shaped --.

Signed and sealed this 15th day of October 1968.

(SEAL)
Attest:

Edward M. Fletcher, Jr.                                EDWARD J. BRENNER
Attesting Officer                                            Commissioner of Patents